United States Patent [19]
Hong et al.

[11] Patent Number: 4,963,725
[45] Date of Patent: Oct. 16, 1990

[54] ADAPTIVE OPTICAL NEURAL NETWORK

[75] Inventors: John H. Hong, Moorpark; Pochi A. Yeh, Thousand Oaks, both of Calif.

[73] Assignee: Rockwell International Corporation, El Segundo, Calif.

[21] Appl. No.: 426,141

[22] Filed: Oct. 24, 1989

[51] Int. Cl.$^5$ .............................................. G01J 1/20
[52] U.S. Cl. .................................. 250/201.9; 350/163
[58] Field of Search ...................... 250/201.9; 350/163, 350/370; 364/800

[56] References Cited

U.S. PATENT DOCUMENTS

| | | | |
|---|---|---|---|
| 4,025,195 | 5/1977 | Ebersole et al. | 356/71 |
| 4,124,278 | 11/1978 | Grinberg | 350/342 |
| 4,372,649 | 2/1983 | Kellie | 350/162 S F |
| 4,718,749 | 1/1988 | Chiou et al. | 350/163 |

OTHER PUBLICATIONS

Y. S. Abu-Mostafa et al., "Optical Neural Computers", Scientific American, Mar. 1987, pp. 88–95.

P. Yeh et al., "Real-Time Optical Image Substraction Using Dynamic Holographic Interference in Photorefractive Media" Optics Letters, vol. 13, No. 7, pp. 586–588 (Jul. 1988).

D. Psaltis et al., "Adaptive Optical Networks Using Photorefractive Crystals", Applied Optics, vol. 27, No. 9, pp. 1752–1759 (May 1, 1988).

*Primary Examiner*—David C. Nelms
*Assistant Examiner*—Stephone B. Allen
*Attorney, Agent, or Firm*—John C. McFarren; H. Fredrick Hamann

[57] ABSTRACT

An adaptive optical network is provided for the implementation of learning algorithms. The network comprises a double Mach-Zehnder interferometer in conjunction with a photorefractive crystal that functions as a holographic medium. Light from selectable sources on opposite sides of a beamsplitter is passed through the interferometer, at least one arm of which includes a spatial light modulator for imprinting a data pattern on the light. The light is directed into the holographic medium to develop a refractive index grating corresponding to the data pattern. Light from the hologram is sensed by a photodetector that provides a signal to a threshold device. The output of the threshold device is compared with a reference signal to produce an error signal that can be used to select the source of light directed through the network. The interconnections of the optical devices function to compute the inner product between the elements of the data pattern and their weight factors. Selecting the light source and changing the data pattern provide additive and subtractive weight change capability for implementing various learning algorithms.

14 Claims, 1 Drawing Sheet

ADAPTIVE OPTICAL NEURAL NETWORK

TECHNICAL FIELD

The present invention relates to optical networks and, in particular, to an optical neural network capable of both additive and subtractive weight changes for implementing learning algorithms.

BACKGROUND OF THE INVENTION

In conventional information processing systems, interconnections between system components generally function merely as communication pathways. In neural networks, however, the interconnections play a dominant role in the data processing scheme. The search for methods to achieve this interconnection intensive computation has led to the use of optical devices and networks in some applications. Holographic techniques, for example, are promising because of the potentially high capacity achievable through parallel processing of information. Volume holograms in particular provide a very compact method of storing informational interconnection patterns. Background and theoretical aspects of these techniques are described by D. Psaltis, D. Brady, K. Wagner in "Adaptive Optical Networks Using Photorefractive Crystals", APPLIED OPTICS, Vol. 27, No. 9, pp. 1752–59, May 1, 1988, and P. Yeh, T. Chang, P. Beckwith in "Real-time Optical Image Subtraction Using Dynamic Holographic Interference in Photorefractive Media", OPTICS LETTERS, Vol. 13, No. 7, pp. 586–88, July 1988. These articles are incorporated herein by reference.

In the most basic network having a plurality of input pattern elements, the output y(p) may be a function of the weighted sum of the input elements. Such a system can be used with a threshold function to dichotomize a set of patterns into two prescribed classes. More complex, multiple layered networks can be built up using this scheme as the basic building block. Extensions to multiple category pattern classification can be achieved simply by having a matrix of weights and a multiplicity of output units.

A simple learning algorithm for the output y(p) can be characterized by the update equation $$w_i(p+1) = w_i(p) + m(p) x_i(p),$$

where $w_i(p)$ is the $i^{th}$ weight at time p, $x_i(p)$ is the $i^{th}$ element of the pattern at time p, and m(p) is a multiplier that depends on the particular learning algorithm. For the perceptron learning algorithm, $$m(p) = \begin{array}{l} 0, \text{ if } y(p) \text{ is correct;} \\ 1, \text{ if } y(p) \text{ is 0 but should have been 1;} \\ -1, \text{ if } y(p) \text{ is 1 but should have been 0.} \end{array}$$

Thus, for direct implementation of this type of algorithm, it can be seen that both additive and subtractive changes must be made to the weighting factors $w_i$.

The basic components for an optical implementation of the network described above are an input device to convert the patterns into an appropriate format (for example, electrical to optical and incoherent to coherent), an interconnection device, and a thresholding device for the output. The function of the interconnection device in this system is to compute the inner product between the input pattern elements $x_i$ and the weight factors $w_i$. This function can be performed by volume holograms in a way that is extendable to the multiple category case that requires multiple inner products.

In one example of an optical neural network, a holographic medium is placed at the Fourier plane of a lens. An input pattern is displayed in a spatial light modulator (SLM) placed at the front focal plane of the lens. The hologram is exposed with a reference plane wave and the pattern in the SLM. After development, a second pattern is loaded into the SLM. Light passing through the SLM and carrying the second pattern is diffracted by the hologram. The amplitude of the diffracted light is the inner product of the first and second patterns of the SLM. With two dimensional patterns a planar hologram is sufficient. However, with multiple categories where a number of different inner products must be computed simultaneously, the added dimension afforded by a volume hologram is preferable to spatial multiplexing of the planar hologram. Multiple category classification is achieved by an angular multiplexing of the volume hologram.

Photorefractive crystals are ideal for the holographic medium because of their dynamic nature. Crystals such as $LiNbO_3$, $BaTiO_3$, and SBN require relatively low optical intensity levels and therefore are very efficient as holographic media. The most efficient photorefractive crystals exhibit photosensitivity approaching that of photographic film.

Prior optical systems have employed photorefractive crystals for adaptive interconnections but have used incoherent erasure to achieve subtractive weight changes. In one known system, a photorefractive crystal is placed at the image plane of an SLM, and a movable piezoelectric mirror is used to provide either a coherent or an incoherent reference beam. For additive changes to the hologram, a coherent reference beam is provided so that the hologram is strengthened. For subtractive changes, the reference beam is made incoherent with respect to the object beam so that nonuniform incoherent erasure results. This method is roughly equivalent to providing a weight bias in which erasure results in subtraction. Incoherent erasure, however, does not take full advantage of the phase sensitive nature of holography. Therefore, a need exists for an adaptive optical neural network that exploits the coherent capability of holograms to provide both additive and subtractive weight change capabilities necessary for implementing learning algorithms.

SUMMARY OF THE INVENTION

The present invention comprises an optical neural network that utilizes a holographic medium and is capable of both additive and subtractive weight changes. Because the holographic process records both modulus and phase of optical patterns, holographic interconnection techniques are employed to store bipolar valued weights. In the present invention, a photorefractive crystal is used to provide a multiple exposure hologram in which each exposure results in an index grating having a relative phase difference of either zero or pi.

A basic component of the present invention is an optical configuration known as a double Mach-Zehnder interferometer. In this optical network a first light beam from a laser source is split into two paths by a dielectric beamsplitter. The two light paths are directed to intersect within a photorefractive crystal to create a grating. A second light beam is directed toward the opposite side of the beamsplitter so that the paths of the transmitted and reflected portions of the second beam traverse the same paths as those of the first beam. Stokes' principle of reversibility governs the relationship between the reflection and transmission coefficients experienced by the two laser beams. As a result, if the two beams are accurately aligned, the two gratings produced in the photorefractive crystal are mutually out of phase by pi. The two laser beams are controlled by first and second shutters placed upstream from the beamsplitter. In normal operation, the opening of the shutters is mutually exclusive so that the second shutter is closed when the first is open and the first is closed when the second is open.

After passing through the photorefractive crystal, the light beam is directed to a photodetector that provides an electrical output to a threshold device. The threshold device provides a signal corresponding to a 1 or 0 that is applied as a negative input to a summing junction. A reference 1 or 0 is also input to the summing junction to produce an error signal output corresponding to 1, 0, or −1. The error signal is then use to control operation of the laser beam shutters according to a preprogrammed learning algorithm.

BRIEF DESCRIPTION OF THE DRAWINGS

For a more complete understanding of the present invention and for further advantages thereof, the following Description of the Preferred Embodiment makes reference to the accompanying Drawings, in which the FIGURE is a schematic diagram of an adaptive optical neural network of the present invention.

DESCRIPTION OF THE PREFERRED EMBODIMENT

Figure 1:
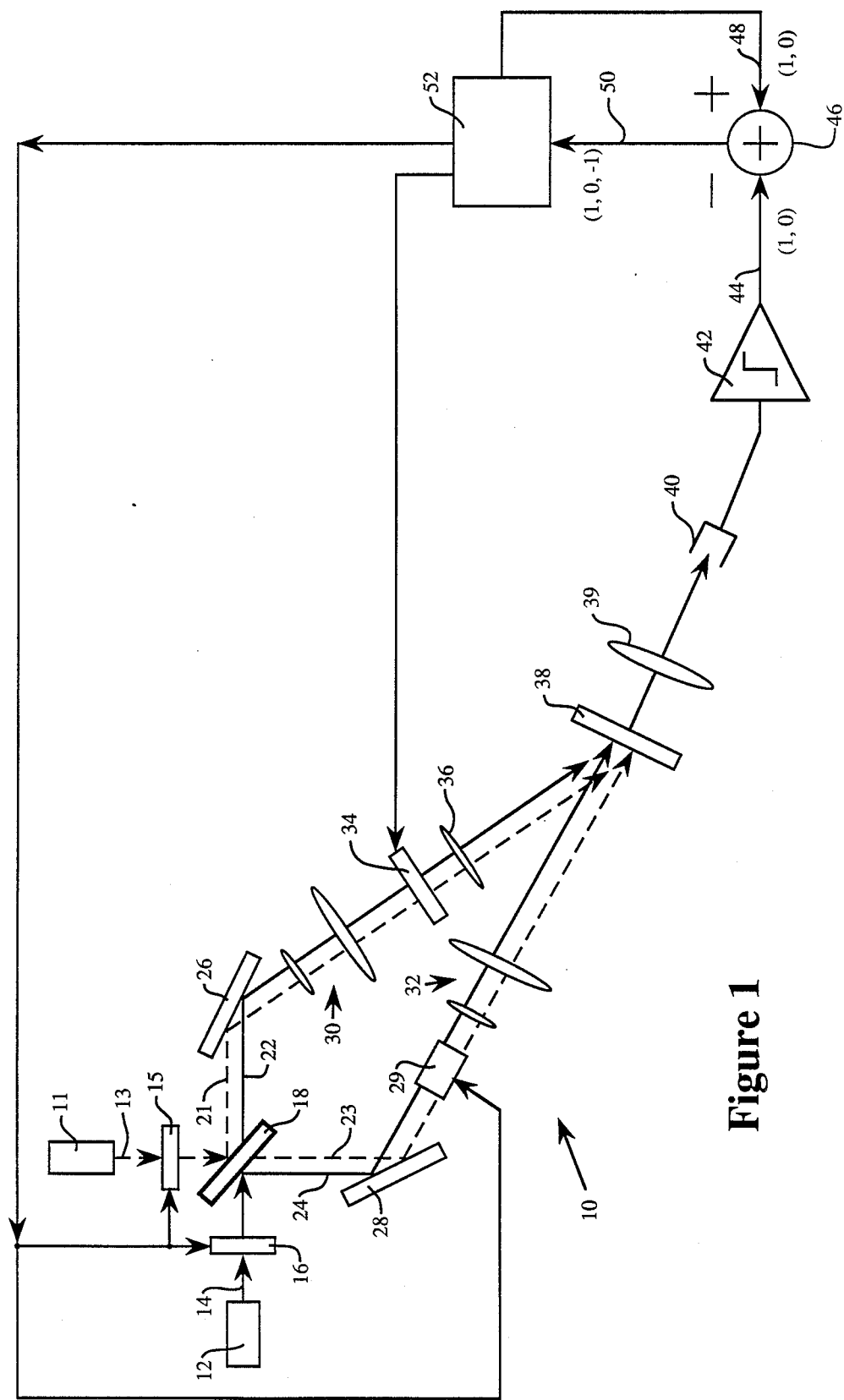

Referring to the FIGURE, an adaptive optical neural network 10 of the present invention is illustrated in schematic form. The function of the optical connections of network 10 is to compute the inner product between elements of the input pattern $x_i$ and their weight factors $w_i$. Although the present invention is particularly suitable for the multiple category case where a multiplicity of inner products are computed simultaneously, the following description focuses on the single output case for purposes of clarity and simplicity.

In network 10, a first source 11 and a second source 12 generate a first laser beam 13 and a second laser beam 14, respectively. To distinguish the light from the two sources, light from source 11 is illustrated with a broken line. Also, beam 14 has the same nominal wavelength as beam 13 and may be derived from source 11 as an alternative to second source 12. Shutters 15 and 16 open or close to pass or block laser beams 13 and 14, respectively. In normal operation, shutter 16 is closed when shutter 15 is open and shutter 15 is closed when shutter 16 is open.

When shutter 15 is open, beam 13 is split by a beamsplitter 18 into a reflected beam 21 and a transmitted beam 23. Likewise, when shutter 16 is open, beam 14 is split by beamsplitter 18 into a transmitted beam 22 and a reflected beam 24. Beams 13 and 14 are positioned so that beams 21 and 22 traverse precisely the same path on one side of beamsplitter 18 and beams 23 and 24 traverse precisely the same path on the opposite side of beamsplitter 18. The relationship between the reflection (r) and transmission (t) coefficients for beam 13 and the coefficients for beam 14 (r' and t', respectively) is governed by Stokes' principle of reversibility. This principle leads to the result $$t = t' \text{ and } rt^* + r't'^* = 0.$$

Further discussion of this principle can be found in U.S. Pat. No. 4,718,749 entitled "Phase-Conjugate Interferometric Coherent Image Subtraction", which is incorporated herein by reference.

The beams reflected and transmitted by beamsplitter 18 are directed by mirrors 26 and 28 through lens systems 30 and 32, respectively. A read/write shutter 29 may be place in the path of beams 23 and 24. Read/write shutter 29 remains open for weight change operations (writing) and is closed for system interrogation (reading). Lens system 32 directs light from beam 23 or 24 directly into a photorefractive crystal 38. Lens system 30 directs light from beam 21 or 22 through a spatial light modulator (SLM) 34 having a preprogrammed pattern of data. A lens 36 directs the light from SLM 34 into photorefractive crystal 38. Lens 36 is positioned so that SLM 34 is at its front focal plane and photorefractive crystal 38 is at its Fourier plane. The light output by photorefractive crystal 38 is collected by a lens 39 and sensed by a photodetector 40. Photodetector 40 may comprise a detector array. The electrical signal output by photodetector 40 is received by a threshold device 42 that provides an output 44 corresponding to 1 or 0. Output 44 is provided as a negative input to a summing junction 46 that also receives a reference signal corresponding to a 1 or 0 as a positive input. Summing junction 46 outputs an error signal 50 comprising 1, 0, or −1. A controller 52, which may comprise a digital processor, an analog controller, or a manual switching device, receives error signal 50, controls operation of shutters 15, 16, and 29, and may generate reference signal 48 and provide the pattern to SLM 34. Controller 52 can implement the perceptron learning algorithm, for example, by opening shutter 16 if error signal 50 is 1, opening shutter 15 if error signal 50 is −1, and making no change if error signal 50 is 0.

Optical network 10 allows multiple exposures of photorefractive crystal 38. If SLM 34 contains a pattern having an amplitude distribution of a(x',y'), then the amplitude, $G_f(x,y)$, of the refractive index grating written in photorefractive crystal 38 due to beam 13 from source 11 can be described by the expression $$G1(x,y) = K(1 - \exp(-t1/tc)) \frac{A(x,y)}{I_0 + |A(x,y)|^2},$$

where $t_c$ is the time constant of photorefractive crystal 38 (assuming the intensity is kept constant for all exposures), $t_l$ is the exposure time, A(x,y) is the Fourier transform of a(x',y'), $I_O$ is the reference beam intensity, and K is a constant determined by the characteristics of photorefractive crystal 38. If source 11 is turned off and source 12 is turned on (such as by operation of shutters 15 and 16) without changing the data pattern in SLM 34, the new grating written in photorefractive crystal 38 is proportional to the first but with the opposite sign. In particular, if the second exposure time is $t_2$, then $G_2(x,y)$ can be described by the expression $$K[(1 - \exp(-t1/tc))\exp(-t2/tc) -$$

$$(1 - \exp(-t2/tc))] \frac{A(x,y)}{I_0 + |A(x,y)|^2}.$$

This result indicates that true subtractive weight changes are thus possible without the use of external phase shifters. In addition, it can be seen that the initial refractive index hologram is partially erased due to the presence of the writing beams (causing incoherent erasure) as the new out of phase hologram is being written. Therefore, the actual weight update equation is a modification of the ideal rule stated above and is given by $$w_i(p+1) = \exp(-t_e/t_c) w_i(p) + [1-\exp(-t_e/t_c)] m(p) x_i(p),$$

where $t_e$ is the exposure time, so that the old weight distribution is diminished slightly as a new hologram is written. It is anticipated that this "forgetting" effect will prove beneficial in an optical implementation where the amplitude of the hologram has a finite dynamic range. In this case, the effect may serve to normalize the weight values during the learning process so that the photorefractive crystal does not become saturated.

The optical components of network 10 achieve the function of computing the inner product between the input pattern and the weight factors as stated above. The output y(p) of photodetector 38, as derived from the foregoing, may be expressed as $$y(p) = |<w_i(p), x_i(p)>|^2.$$

The output y(p) of photodetector 38 is processed by threshold device 42 and compared with reference signal 48 to yield error signal 50. Error signal 50 is used to open and close shutters 15 and 16, thereby setting the phase for exposure of photorefractive crystal 38. Modification of the hologram written in photorefractive crystal 38 provides the means for implementing learning algorithms. In essence, subtractive weight changes are made by using the opposite phase for a subsequent exposure of photorefractive crystal 38, and additive weight changes are made by using the same phase for a subsequent exposure. As stated above, photorefractive crystal 38 may comprise a volume hologram, and detector 40 and threshold device 42 may comprise an array for detecting a multiplicity of pattern elements. In addition, a second SLM (not shown) may be included in the reference arm of the interferometer to yield a coded reference beam corresponding to the multiple outputs. The patterns of the SLMs can then be modified according to the learning algorithm and the error signals for each of the pattern elements to provide additive and subtractive weight changes for each of the multiplicity of elements.

Although the present invention has been described with respect to a specific embodiment thereof, various changes and modifications may be suggested to one skilled in the art. Therefore, it is intended that the present invention encompass such changes and modifications as fall within the scope of the appended claims.

We claim:

1. An adaptive optical network, comprising:
   a source of coherent light;
   means for splitting said light into first and second paths;
   means for modulating the light in one of said paths with a predetermined pattern;
   a holographic medium for receiving light from said paths and generating a hologram corresponding to said pattern;
   means for detecting light from said hologram to generate an output signal;
   means for comparing said output signal with a reference signal to produce an error signal; and
   means for altering the phase of said light based on said error signal.

2. The optical network of claim 1, wherein said splitting means comprises an optical beamsplitter, said modulating means comprises a spatial light modulator, and said holographic medium comprises a photorefractive crystal.

3. The optical network of claim 2, wherein said phase altering means comprises:
   means for directing said light in first and second directions through opposite sides of said beamsplitter so that light reflected and transmitted by said beamsplitter traverses said first and second paths; and
   means for selecting one of said light directions.

4. The optical network of claim 3, wherein said direction selecting means comprises first and second shutters positioned in said first and second light directions, respectively.

5. The optical network of claim 4, wherein said comparing means comprises:
   a summing junction for summing said reference signal with a negative of said output signal to produce said error signal; and
   a controller for analyzing said error signal and for opening and closing said first and second shutters based on said analysis.

6. The optical network of claim 2, further comprising a means for altering said pattern in said spatial light modulator based on said error signal.

7. An adaptive optical network, comprising:
   a source of coherent light;
   an optical interferometer having a beamsplitter for splitting the light into first and second light beam paths;
   means for directing the light into said interferometer from first and second directions;
   a spatial light modulator positioned in one of said light beam paths for modulating the light with a predetermined pattern entered in said modulator;
   a holographic medium positioned for exposure to said modulated light to produce a hologram corresponding to said pattern;
   a photodetector for detecting said hologram and providing an output signal;
   a junction for comparing said output signal with a reference signal to generate an error signal; and
   a controller connected from said junction to said directing means for selecting one of said light directions based on said error signal.

8. The optical network of claim 7, wherein said controller is connected to said spatial light modulator for modifying said pattern based on said error signal.

9. The optical network of claim 8, wherein said interferometer comprises a double Mach-Zehnder interferometer and said holographic medium comprises a photorefractive crystal.

10. The optical network of claim 9, wherein said first and second light directions are from opposite sides of said beamsplitter and are aligned such that the light from both said light directions traverses said first and second light beam paths when split by said beamsplitter.

11. The optical network of claim 10, wherein said controller selects said light direction in accordance with a predetermined learning algorithm.

12. The optical network of claim 11, wherein said photodetector detects elements of said hologram corresponding to elements of said pattern in said spatial light modulator and said controller modifies said pattern elements in accordance with said predetermined learning algorithm.

13. A method of implementing a learning algorithm using an optical network, comprising the steps of
providing a source of coherent light having a phase;
splitting the light into first and second paths;
modulating the light in one of said paths with a predetermined pattern;
receiving light from said paths in a holographic medium;
generating a hologram in said medium corresponding to said pattern;
detecting light from said hologram and generating an output signal;
comparing said output signal with a reference signal and generating an error signal; and
altering the phase of said light in said one of said paths based on said error signal and the learning algorithm.

14. The method of claim 13, further comprising the step of modifying said pattern based on said error signal and the learning algorithm.

* * * * *